US008024576B2

(12) United States Patent
Gargaro et al.

(10) Patent No.: US 8,024,576 B2
(45) Date of Patent: Sep. 20, 2011

(54) METHOD AND SYSTEM FOR AUTHENTICATING USERS WITH A ONE TIME PASSWORD USING AN IMAGE READER

(75) Inventors: Gianluca Gargaro, Rome (IT); Patrizio Trinchini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 12/059,655

(22) Filed: Mar. 31, 2008

(65) Prior Publication Data

US 2009/0249077 A1   Oct. 1, 2009

(51) Int. Cl.
*G06F 21/00* (2006.01)
*G06F 21/06* (2006.01)

(52) U.S. Cl. ............ 713/183; 713/182; 713/150; 726/2; 726/4; 726/9; 726/21; 726/22; 705/72; 705/64; 708/136; 708/135

(58) Field of Classification Search .................. None
See application file for complete search history.

(56) References Cited

U.S. PATENT DOCUMENTS

| 7,496,959 | B2 * | 2/2009 | Adelstein et al. ............... 726/21 |
| 7,555,480 | B2 * | 6/2009 | Zhang et al. .......................... 1/1 |
| 2003/0208689 | A1 * | 11/2003 | Garza ........................... 713/201 |
| 2007/0079135 | A1 | 4/2007 | Saito | |
| 2007/0256118 | A1 | 11/2007 | Nomura et al. | |
| 2008/0069120 | A1 * | 3/2008 | Thomas ........................ 370/401 |
| 2010/0088754 | A1 * | 4/2010 | Ghislanzoni ...................... 726/9 |
| 2010/0275010 | A1 * | 10/2010 | Ghirardi ....................... 713/155 |

FOREIGN PATENT DOCUMENTS

TW         436748         5/2001

OTHER PUBLICATIONS

Nitesh Saxena, Jan-Erik Ekberg, Kari Kostianen and N. Asokan, Secure Device Pairing on a Visual Channel, IEEE Symposium on Security and Privacy, Oakland (appeared as short paper), May 2006, pp. 1-17, Irvine, California.

* cited by examiner

*Primary Examiner* — Syed A. Zia
(74) *Attorney, Agent, or Firm* — King & Spalding

(57) ABSTRACT

A method and system to authenticate users with a one time password by using a visual communication channel. The method and system may include using a device to capture a sequence of images being displayed and decrypt an encrypted one time password contained in the sequence of images.

18 Claims, 4 Drawing Sheets

METHOD AND SYSTEM FOR AUTHENTICATING USERS WITH A ONE TIME PASSWORD USING AN IMAGE READER

BACKGROUND OF THE INVENTION

1. Field of the Invention

This invention generally relates to one time password authentication devices and more particularly to using a portable device to decode encrypted passwords.

2. Background

An authentication factor is a piece of information used to verify a person's identity for security purposes. Factors are generally classified as: (a) something the user has (for example, an ID card or a security token like a mobile phone SMS token, USB token, smart card reader or One Time Password (OTP) token, etc.); (b) something the user knows (for example, a password, personal identification number (PIN), etc.); and (c) something the user is or does (for example, a fingerprint or retinal pattern, signature or voice recognition, other biometric information, etc.).

Traditional authentication schemes implement the use of passwords to authenticate users. Such "static" password schemes are comprised of one-factor authentication (i.e., the password) and are viewed as providing minimal security. One-factor authentication is therefore known as weak authentication. By contract, two-factor authentication (T-FA), also known as strong authentication, requires the use of two different factors for authentication in order to achieve a higher level of authentication assurance. T-FA systems are often used to deliver increased security for corporate networks, applications, and all forms of highly-valued information assets.

However many of the technologies required by some of the authentication factors can present certain problems like: cost, specific hardware requirements, support of specific wireless protocols where a trust pairing procedure needs to be completed in advance, and required time synchronization between the token card and the authentication service.

SUMMARY OF THE INVENTION

The invention provides a new method and system for authenticating users with a one time password using a visual communication channel, comprising: a user requesting access to a protected resource that requires authentication and thereafter receiving a sequence of images that are displayed upon a monitor of the user, wherein the sequence of images represents an encrypted data stream that contains a one time password which has a lifetime validity period. The user can place a hardware decoder (also referred to as an image reader) near or against the monitor to capture the sequence of images as they are being displayed, wherein the hardware decoder has at least one data photodiode and at least one synchronization photodiode. Upon capturing the images, the hardware decoder can convert the sequence of images into the encrypted data stream and can decrypt the encrypted data stream to obtain the one time password and present the one time password on a display. The user can read the one time password on the hardware decoder display and can use the one time password for authentication. The user can then access the protected resource if the submitted one time password was properly decrypted from the encrypted data stream and the lifetime validity period of the one time password did not expire.

Additional features and advantages are realized through the techniques of the present invention. Other embodiments and aspects of the invention may be recognized from the description and the drawings.

BRIEF DESCRIPTION OF THE DRAWINGS

The subject matter which is regarded as the invention is particularly pointed out and distinctly claimed in the claim(s) at the conclusion of the specification. The foregoing and other objects, features, and advantages of the invention are apparent from the following detailed description taken in conjunction with the accompanying drawings in which:

The detailed description explains an embodiment of the invention, together with the advantages and features, by way of example with reference to the drawings, which are not necessarily drawn to scale.

DETAILED DESCRIPTION OF THE INVENTION

Figure 1:
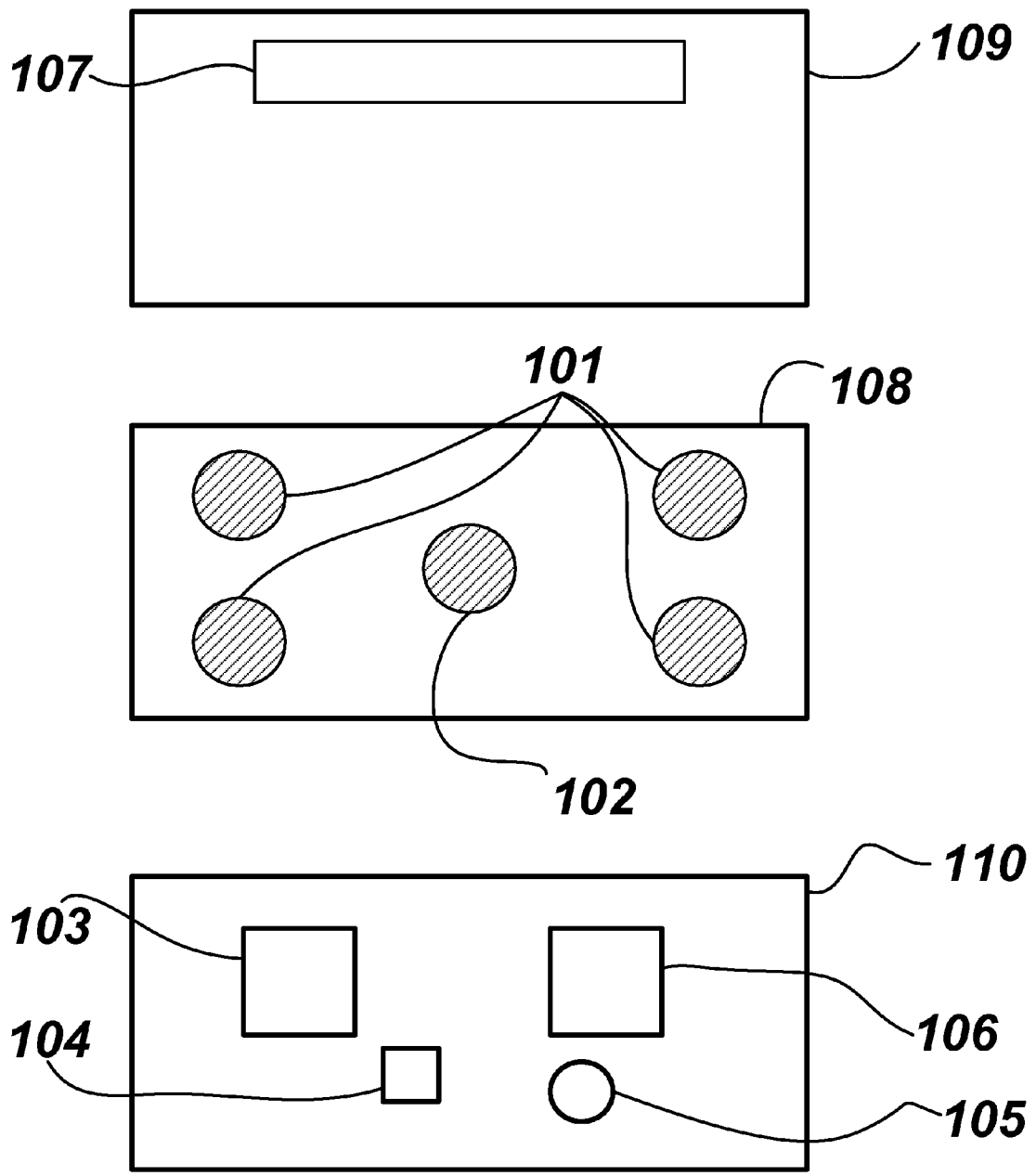
FIG. 1 illustrates an embodiment of the hardware decoder, also known as an image reader.

FIG. 1 illustrates an embodiment of the hardware decoder (also referred to as the image reader), that can be comprised of a set of photodiodes, memory for required data storage, electronic hardware for converting images captured by photodiodes into a data stream, decryption hardware that decrypts the incoming data stream, and an LCD display that shows the one time password (OTP) (commonly known as a security token) to the user. A more detailed description of the embodiment of the invention is presented herein.

The back of the hardware decoder 108 may contain photodiodes 101, 102 that can be connected to electronic components 106 on the inside of the hardware decoder 110 that can convert images to a sequence of bits. The current electronic parts market provides cost effective photodiodes (such as PIN or PIN avalanche photodiodes) that can capture weak light emissions, for example the light emitted by a white image on a back-lighted LCD display, at a very fast rate. It is not uncommon to have photodiodes with a bandwidth above 100 kilobits per second. Alternatively, some manufacturers even provide light-to-digital photodiodes wherein the diode itself contains analog-to-digital conversion (ADC) circuitry. Essentially, electronic components 106 can be embedded in the photodiodes 101, 102.

The inside of the hardware decoder 110 may have a small microprocessor 103 (for example, a low cost Intel 8051-compatible NMOS or CMOS processor) to perform fast cryptographic operations for decryption of the one time password sent by the service. Electrically Erasable Programmable Read-Only Memory (EEPROM) can be used for storage of the user's decryption key 104, a battery can be included for power supply 105, and a small LCD display with associated electronic components may be included to display the decrypted one time password 107 on the front of the hardware decoder 109. The back of the hardware decoder 108 may have at least one, but preferably five photodiodes for image capture 101, 102.

Other similar hardware decoders are also envisioned, wherein a wide variety of electronic components can be used to provide the same functionalities described in the embodiment. For example, power can be provided through a small solar panel (as common in calculators) or through a wired connection (such as a USB cable). Additionally, there are microprocessors, memory devices, and image capture components that could provide the same functionality as the components used in the described embodiment. Additional aspects of the hardware decoder are also envisioned, such as a power on/off switch and a "retry image capture" button. Finally, the hardware decoder device may be embedded within electronic devices that have additional components and other related or unrelated uses.

Today's electronic components market also provides cost effective components with multiple functionality embedded onto a single electronic device, often called a "system-on-a-chip" (SoC). An SoC can consist of one or more microcontrollers or microprocessors, memory blocks (ROM, RAM, EEPROM and/or flash), analog interfaces (such as an analog-to-digital converter), peripheral connections, and other components.

The hardware decoder could therefore be designed using an SoC which is programmed to execute mathematical computations such as the necessary encryption-decryption algorithms. The SoC could also store programming code required to decrypt the OTP on an integrated EEPROM and additionally include ROM that is factory-programmed with specific data (for instance a unique decryption key). The SoC may even be designed to interface directly with the electronic sensors and I/O components (the photodiodes and LCD display).

SoCs incorporating Intel 8051-compatible NMOS or CMOS processors have been used for many years and for a wide variety of purposes. They are produced by a number of low cost manufacturers. SoC chips specifically designed for the conceived hardware decoder can be manufactured at very low cost, possibly under ten dollars for each hardware decoder device.

For demonstration purposes, the invention is presented in a scenario where access to the protected resources is controlled by a web service that relies on an authorization service for user identity confirmation. However, the disclosed invention can be implemented for use with a wide variety of different methods and systems that provide identity confirmation and access to protected resources.

Figure 2:
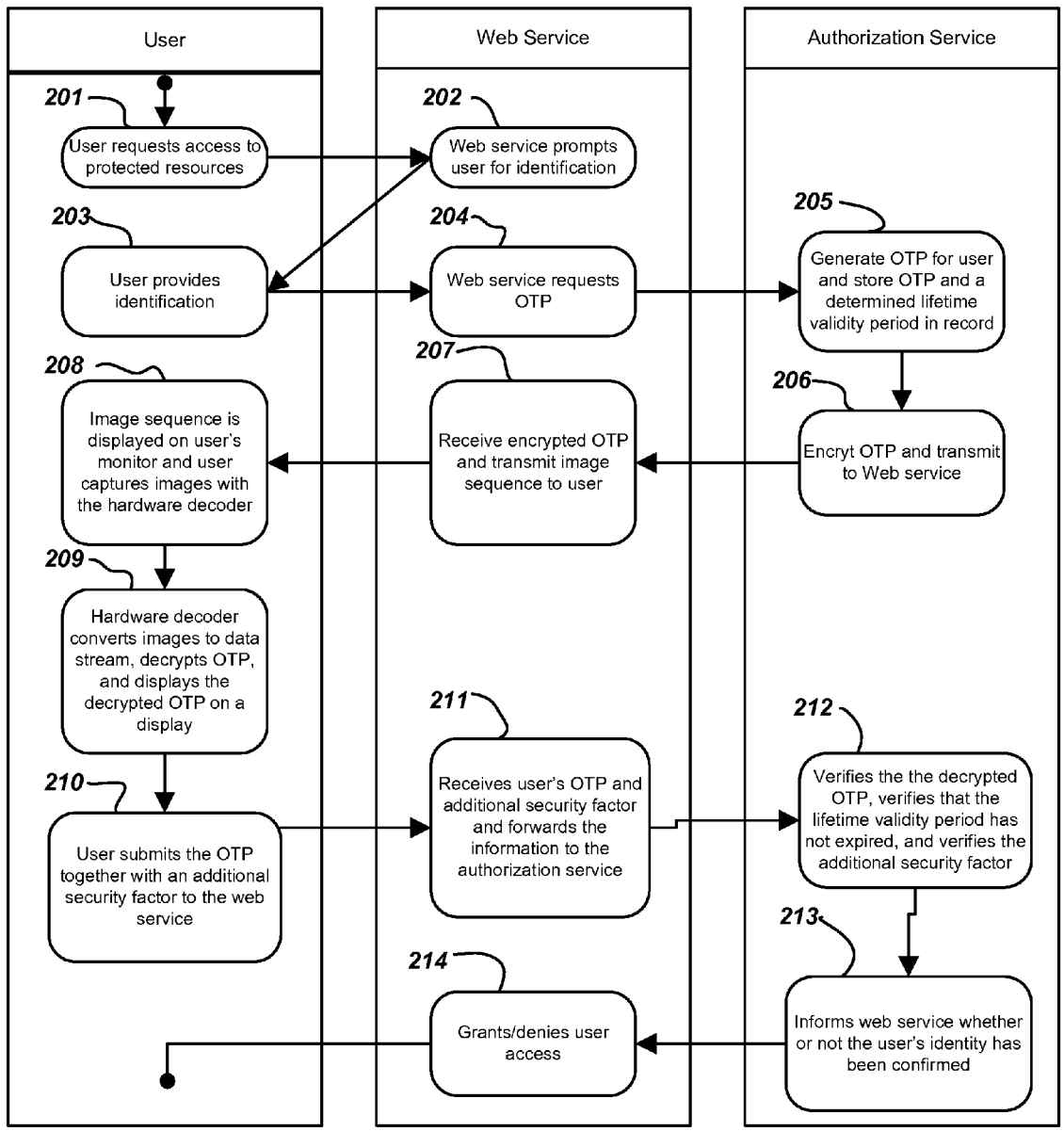
FIG. 2 illustrates a process wherein a user can access protected resources after using a hardware decoder to obtain an OTP that is validated by the authorization service.

FIG. 2 demonstrates one possible use of the invention, initiated when a user requests access to protected resources at step 201, such as access to information, services or applications residing on another computer device on a network. For example, the user may request access to confidential data located on the Internet or on a corporate network.

Either the web service can prompt the user for (and thereafter receives at step 203) the hardware decoder identification number (ID) at step 202 or the web service may have a record of the user's hardware decoder ID. The web service can transmit the hardware decoder ID to the authentication service and request an OTP (encrypted security token) at step 204. An alternative process is for the authentication service (not the web service) to contain a record of the user's hardware decoder ID, in which case the web service can transmit the user's identification, instead of the user's hardware decoder ID, when requesting the OTP.

The authentication service may then generate an OTP as a data stream and an associated lifetime validity period for that OTP (such as 1 minute or 5 minutes) at step 205. The data stream can then be encrypted and transmitted to the web service at step 206. The web service can convert the encrypted data stream into a sequence of images in a supported image or video format and transmit the image sequence to the user's computer, preferably to be displayed in an Internet browser on the user's monitor at step 207. An alternative process is for the authentication service, not the web service, to convert the encrypted data stream into the image sequence and the web service simply transmits the received image sequence to the user's computer.

The monitor can be a display device such as a CRT or LCD. The monitor can be connected to any type of computer or electronic device, including a personal computer, personal digital assistant (PDA), smartphone, or cellular phone. The user can place the hardware decoder upon the portion of the monitor where the images are to be displayed and the photodiodes can thereafter capture the images as they are displayed sequentially at step 208.

The sequence of images can simply be a series of black and white geometric shapes, although more complex images with multiple colors can be used in more complex embodiments of the invention. The images can be transmitted to the computer as a group of distinct image files, as an animated image file, or as a video file. Any of the common image and video formats can be used (i.e., GIF, Animated GIF, JPEG, BMP, 3GP, FLV, AVI, MPEG, MOV, and WMV), as well as any image and video formats supported by the Multimedia Messaging Service (MMS) protocol. Other formats can be supported as well.

Leaving FIG. 2 in order to further describe the image capture process, FIG. 1 illustrates the 5 photodiodes on the back of the hardware decoder 108. The reading capture capability of these photodiodes device is preferably robust enough to overcome temporary slowness or difference speed in the sequence of black and white images because of a "sync" photodiode 102 that ensures proper synchronization. This means that the synchronization signal captured by the "sync" photodiode 102 will be delayed or anticipated in time exactly the same way the data signal captured by the four "data" photodiodes 101 will be delayed or anticipated because all five signals are separate regions within the same image (and thus affected by the same environmental conditions).

Figure 3:
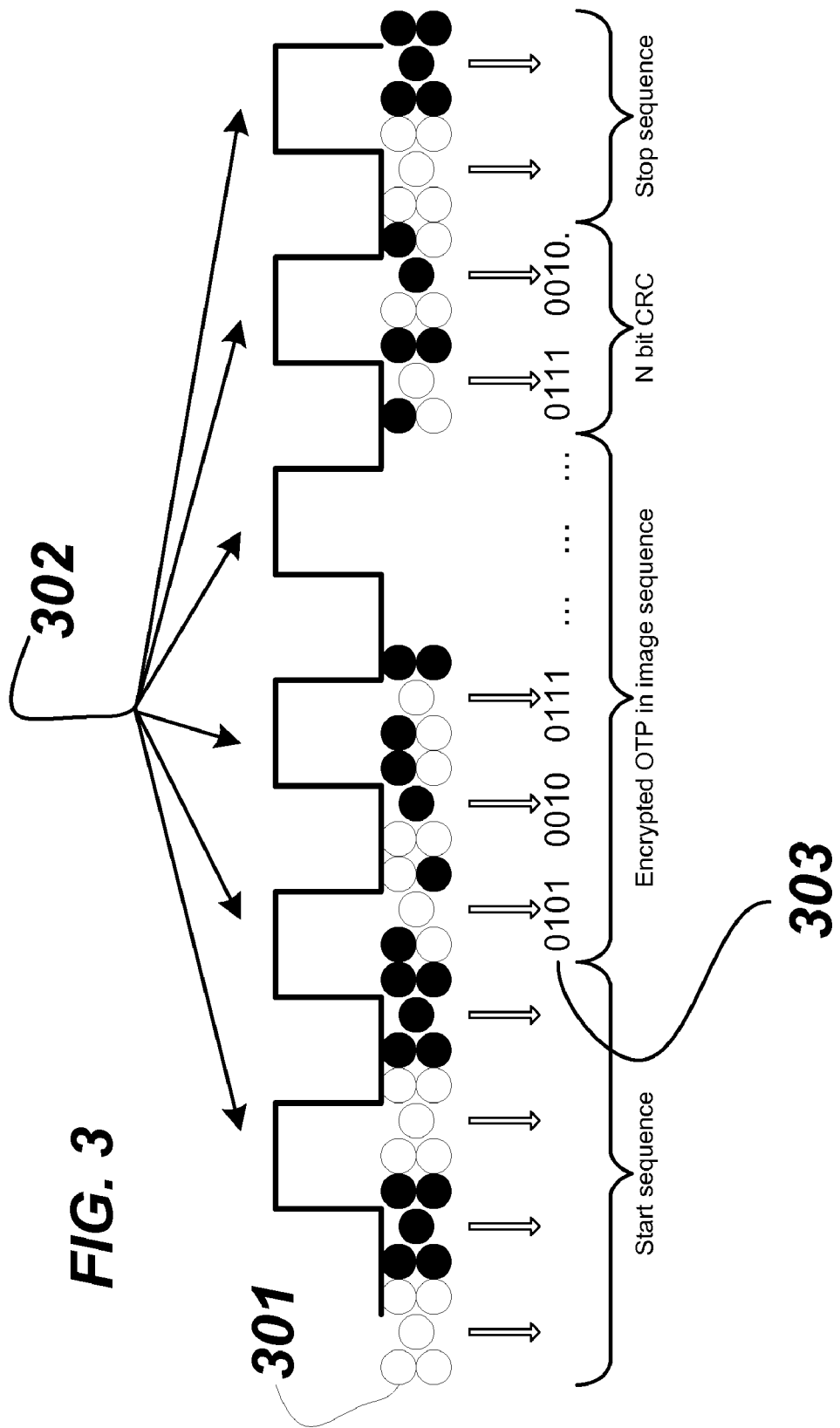
FIG. 3 illustrates a transmission of a sequence of images containing the encrypted one time password.

FIG. 3 illustrates the typical composition of the image sequence 301, wherein a start sequence can be used to indicate to the hardware decoder when the sequence of images representing the encrypted data will begin, thereafter followed by the image sequence representing the encrypted data stream, preferably followed by a cyclic redundancy check (CRC) code to ensure correct receipt of the data, and concluded with a stop sequence that indicates the transmission of images is complete. In the embodiment, the center image may alternate between black and white to keep proper synchronization 302, while in the other four images being captured, black can represent a value of "1" and white can represent a value of "0". The images directed at the four "data" photodiodes can additionally be predetermined to be in a specific order. For example, if the bottom left image may present the first bit, the top left can present the second, the top right can present the third, and the bottom right can present the fourth. As a result, each image in the sequence can represent four bits of data 303 as well as the sync bit.

Figure 4:
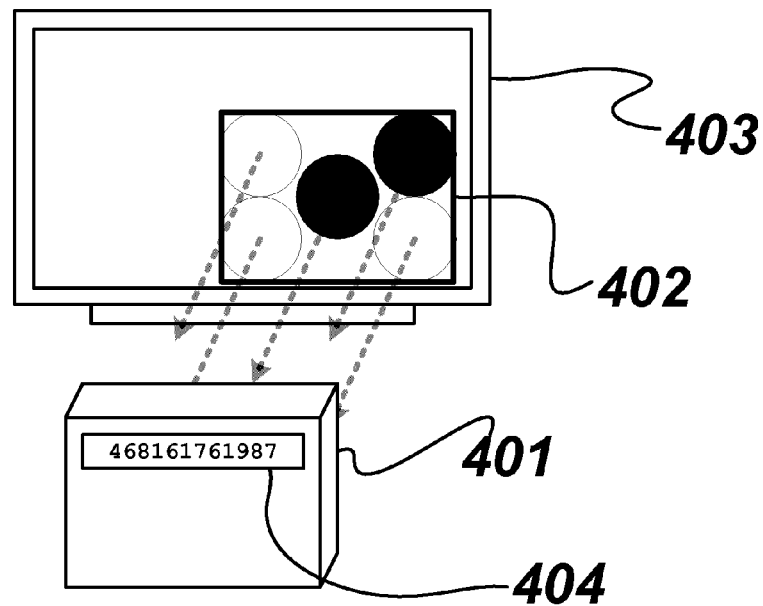
FIG. 4 illustrates a particular image being displayed on a monitor and captured by photodiodes on the back of a hardware decoder.

FIG. 4 illustrates how photodiodes on the back of a hardware decoder 401 can be placed across from a monitor 403 can capture an image 402 as it is sequentially displayed. This method of information transfer may be known as a uni-directional "visual communication channel." By establishing this channel, the decoding hardware provides advantages to the user, such as eliminating the need to be physically or wirelessly connected to the computer receiving the images and is therefore highly portable and can be used with public or shared computers as well as other types of portable electronic devices.

If the computer display become unresponsive or very slow for several seconds during the image capture process (for instance, if an antivirus scan is initiated and temporarily consumes the computer's resources), the correct image sequence may not be displayed correctly. A time-out value programmed into the hardware decoder may cancel the initiated image capture process and a message can be presented on the hardware decoder's display to make the user aware of the error. The user should preferably be able to keep the decoder situated against the monitor and obtain the encrypted security token (OTP) after the same image sequence is replayed on the monitor.

If the hardware decoder fails to capture the image sequence during the security token's lifetime validity period, the card reader could preferably present a message that notifies the user to request a new security token (OTP). Alternatively, a message indicating that the lifetime validity period has expired may be displayed on the user's computer monitor. In either instance, the user may need to request and obtain a new image sequence containing a new security token (OTP) from the authentication service.

It is noted that this particular and exceptional condition is not unique to this embodiment of the invention. The consumption of computer resources by unrelated applications such as an antivirus scanner could prevent a user from completing login procedures for many types of authentication mechanisms. For example, an RSA one time password token is only valid for sixty seconds and if the computer slows down because of other processes during that 60 second time frame, the RSA token will expire and the user will need to get a new RSA token (see http://www.rsa.com/).

Briefly returning to FIG. 1, upon image capture by the data photodiodes 101, either the photodiodes themselves or a separate electrical component 106 can convert the images into a data stream of their binary values, after which the memory 104 and microprocessor 103 can be used to decrypt the data stream and obtain the OTP (the decrypted security token), which may then be displayed on the LCD 107 on the front of the hardware decoder 109. FIG. 4 illustrates an OTP being displayed 404 following the capture of an image sequence.

Returning finally to FIG. 2, upon reading the decrypted OTP on the hardware decoder display at step 209, the user can submit the decrypted OTP and another security factor, such as the user's personal identification number (PIN), to the web service in accordance with the T-FA requirements at step 210. The web service can forward the OTP and PIN to the authentication service at step 211 and if the user's identity is verified and the lifetime validity period of the OTP did not expire at step 212, the authentication service can notify the web service that it confirmed the user's identity at step 213 and the user may be granted access to the requested protected resources at step 214, such as information or applications.

The embodiment of this invention as demonstrated can provide a new authentication factor particularly suitable for T-FA systems, wherein upon requesting access to a protected resource, a sequence of images can be received by a computer device over a network, displayed on a monitor and detected by decoding hardware that is situated against or near the monitor surface. The decoding hardware can capture an image sequence as an incoming data stream, decrypt the data stream using a unique key and present to the user, on a readable display, a one time password to be used as part of a required authentication process.

The use of an authorization service and web service is only one possible embodiment of the invention. The authorization service and web service may be one combined service. Alternatively, many entirely different applications, systems, and services can be envisioned that could provide the encrypted data stream in an image sequence to be decoded and decrypted by the described hardware decoder (image reader) to achieve a secure authorization arrangement.

What is claimed is:

1. A method for authenticating users with a one time password using a visual communication channel, comprising:
    receiving a request for access to a protected resource that requires authentication,
    displaying a sequence of images by a monitor, wherein the sequence of images represents an encrypted data stream that contains a one time password which has a lifetime validity period,
    displaying a synchronization image by the monitor while displaying the sequence of images, the synchronization image being adjusted for each image in the sequence of images to synchronize reception of the sequence of images with a hardware decoder,
    capturing, by the hardware decoder, the synchronization image and the sequence of images as they are being displayed, wherein the hardware decoder has at least one data photodiode for capturing the sequence of images and at least one synchronization photodiode for capturing the synchronization image, the synchronization image indicating to the hardware decoder when to capture an image in the sequence of images, the hardware decoder being placed near or against the monitor,
    the hardware decoder converting the sequence of images into the encrypted data stream, decrypting the encrypted data stream to obtain the one time password and presenting the one time password on a display,
    receiving the one time password for authentication, and
    providing access to the protected resource if the submitted one time password was properly decrypted from the encrypted data stream and the lifetime validity period of the one time password did not expire.

2. The method of claim 1, further comprising displaying a start sequence of images by the monitor, wherein the hardware decoder starts capturing the sequence of images in response to identifying the start sequence of images.

3. The method of claim 1, further comprising displaying a stop sequence of images by the monitor, wherein the hardware decoder stops capturing the sequence of images and begins converting the sequence of images into the encrypted data stream in response to identifying the stop sequence of images.

4. The method of claim 1, wherein the synchronization image comprises a first image and a second image and wherein the synchronization image indicates to the hardware decoder when to capture an image in the sequence of images by alternating between the first image and the second image.

5. The method of claim 4, wherein the hardware decoder captures an image in the sequence of images each time the synchronization image switches between the first image and the second image.

6. The method of claim 1, further comprising displaying a cyclic redundancy check code by the monitor after displaying the sequence of images but before displaying the stop sequence of images.

7. The method of claim 1, wherein the sequence of images are displayed in the form of four separate geometric shapes that are each altered based on the encrypted data stream.

8. The method of claim 7, wherein the hardware decoder comprises four data photodiodes, each photodiode being dedicated to capturing images of one of the four geometric shapes.

9. A system for authenticating users with a one time password using a visual communication channel, comprising:
   a computer, communicably coupled to a monitor, that:
      receives a request for access to a protected resource that requires authentication,
      displays a sequence of images via the monitor, wherein the sequence of images represents an encrypted data stream that contains a one time password which has a lifetime validity period,
      displays a synchronization image via the monitor while displaying the sequence of images, the synchronization image being adjusted for each image in the sequence of images to synchronize reception of the sequence of images with a hardware decoder,
      receives the one time password for authentication, and
      provides access to the protected resource if the submitted one time password was properly decrypted from the encrypted data stream and the lifetime validity period of the one time password did not expire; and
   the hardware decoder that:
      captures the synchronization image and the sequence of images as they are being displayed, wherein the hardware decoder has at least one data photodiode for capturing the sequence of images and at least one synchronization photodiode for capturing the synchronization image, the synchronization image indicating to the hardware decoder when to capture an image in the sequence of images, the hardware decoder being placed near or against the monitor; and
      converts the sequence of images into the encrypted data stream, decrypts the encrypted data stream to obtain the one time password and presents the one time password on a display.

10. The system of claim 9, wherein the computer causes a start sequence of images to be displayed by the monitor and wherein the hardware decoder starts capturing the sequence of images in response to identifying the start sequence of images.

11. The system of claim 9, wherein the computer causes a stop sequence of images to be displayed by the monitor, and wherein the hardware decoder stops capturing the sequence of images and begins converting the sequence of images into the encrypted data stream in response to identifying the stop sequence of images.

12. The system of claim 9, wherein the synchronization image comprises a first image and a second image and wherein the synchronization image indicates to the hardware decoder when to capture an image in the sequence of images by alternating between the first image and the second image.

13. The system of claim 12, wherein the hardware decoder captures an image in the sequence of images each time the synchronization image switches between the first image and the second image.

14. A computer program product for authenticating users with a one time password using a visual communication channel, the computer program product comprising:
   a computer-readable medium having computer-readable program code embodied therein, the computer-readable program code comprising:
      computer-readable program code for receiving a request for access to a protected resource that requires authentication;
      computer-readable program code for causing a sequence of images to be displayed by a monitor, wherein the sequence of images represents an encrypted data stream that contains a one time password which has a lifetime validity period;
      computer-readable program code for causing a synchronization image to be displayed by the monitor while displaying the sequence of images, the synchronization image being adjusted for each image in the sequence of images to synchronize reception of the sequence of images with a hardware decoder;
      computer-readable program code for receiving, at the hardware decoder, the synchronization image and the sequence of images as they are being displayed, wherein the hardware decoder has at least one data photodiode for capturing the sequence of images and at least one synchronization photodiode for capturing the synchronization image, the synchronization image indicating to the hardware decoder when to capture an image in the sequence of images, the hardware decoder being placed near or against the monitor;
      computer-readable program code for converting the sequence of images into the encrypted data stream, decrypting the encrypted data stream to obtain the one time password and presenting the one time password on a display;
      computer-readable program code for receiving the one time password for authentication; and
      computer-readable program code for providing access to the protected resource if the submitted one time password was properly decrypted from the encrypted data stream and the lifetime validity period of the one time password did not expire.

15. The computer program product of claim 14, further comprising computer-readable program code for causing a start sequence of images to be displayed by the monitor, wherein the hardware decoder starts capturing the sequence of images in response to identifying the start sequence of images.

16. The computer program product of claim 14, further comprising computer-readable program code for causing a stop sequence of images to be displayed by the monitor, wherein the hardware decoder stops capturing the sequence of images and begins converting the sequence of images into the encrypted data stream in response to identifying the stop sequence of images.

17. The computer program product of claim 14, wherein the synchronization image comprises a first image and a second image and wherein the synchronization image indicates to the hardware decoder when to capture an image in the sequence of images by alternating between the first image and the second image.

18. The computer program product of claim 17, wherein the hardware decoder captures an image in the sequence of images each time the synchronization image switches between the first image and the second image.

* * * * *